United States Patent [19]
Winje

[11] Patent Number: 5,381,384
[45] Date of Patent: Jan. 10, 1995

[54] VERTICAL VELOCITY AMBIGUITY RESOLUTION METHOD

[75] Inventor: Robert L. Winje, Manlius, N.Y.

[73] Assignee: The United States of America as represented by the Secretary of the Navy, Washington, D.C.

[21] Appl. No.: 191,454

[22] Filed: May 9, 1988

[51] Int. Cl.⁶ .............................................. G01S 15/58
[52] U.S. Cl. ..................................................... 367/89
[58] Field of Search ..................... 367/89, 91; 364/565; 73/488; 342/104, 108

[56] References Cited

U.S. PATENT DOCUMENTS 3,298,024 1/1967 Böhm .................................. 342/127
4,244,026 1/1981 Dickey, Jr. ............................ 367/89

Primary Examiner—Daniel T. Pihulic
Attorney, Agent, or Firm—John P. Tarlano

[57] ABSTRACT

The present invention relates to a method of resolving an ambiguity in the estimation of vertical velocity of a moving underwater or surface vehicle. Three acoustic pulses are successively transmitted. They are received by a series of detectors located on the vehicle. The time difference between correlated first and second received pulses is measured. The time different between correlated first and third received pulses is also measured. The phase shifts between the three transmitted pulses and three received pulses is measured. This information is used to determine the vertical velocity of the vehicle.

4 Claims, 2 Drawing Sheets

VERTICAL VELOCITY AMBIGUITY RESOLUTION METHOD

BACKGROUND OF THE INVENTION

The present invention relates to a method of resolving an ambiguity in the estimation of vertical velocity of a moving underwater or surface vehicle. Three acoustic pulses are successively transmitted. They are received by a series of detectors located on the vehicle. The time difference between correlated first and second received pulses is measured. The time different between correlated first and third received pulses is also measured. The phase shifts between the three transmitted pulses and three received pulses is measured. This information is used to determine the vertical velocity of the vehicle.

In U.S. Pat. No. 4,244,026, two acoustic pulses are transmitted. They are received by a series of detectors located on a moving underwater vehicle. Certain of these detectors correlate these received pulses. The time difference between the two received pulses is measured. The phase shifts between the two transmitted pulses and two received pulses is measured. This information is used in an attempt to measure the vertical velocity of such a vehicle. However, there is an ambiguity in the vertical velocity. This ambiguity is noted in the first full paragraph in column 10 of the '026 patent. The ambiguity is due to an inability to distinguish between the difference in phase shifts of the first and second received pulses, and that difference plus 360 degrees or a multiple of 360 degrees.

The present invention relates to a method of resolving the ambiguity in the estimation of a vertical velocity component of a moving vehicle, that is produced by the technique of U.S. Pat. No. 4,244,026.

SUMMARY OF THE INVENTION

In the disclosed method, a first pulse is transmit by an acoustic transmitter. The first pulse is reflected from the land beneath the vehicle. The first pulse is detected by all of the detectors in a line of detectors, one of which is used as a reference. A second pulse is transmitted. The second pulse is detected by all of the detectors. The first output of reference detector is compared with the second outputs of all detector, to obtain a first match in outputs. The reception time difference and phase shift difference between the received first pulse and the received second pulse is determined. The first reception time difference and first shift phase difference are used in generating a first algorithm. A third pulse is transmitted and the third pulse is detected by all detectors. The first output of the reference detector is compared with the outputs of all detectors to obtain a second match in outputs. The reception time difference and phase shift difference between the received first pulse and the received third pulse are determined. The second reception time difference and second phase shift difference are used in generating a second algorithm. The first algorithm is compared with the second algorithm. The lowest value of the greater of the two algorithm values is the true vertical velocity.

An object of the invention is to provide a technique to determine the vertical velocity, without ambiguity, of a moving underwater or surface vehicle.

DESCRIPTION OF THE PREFERRED EMBODIMENTS

Figure 1:
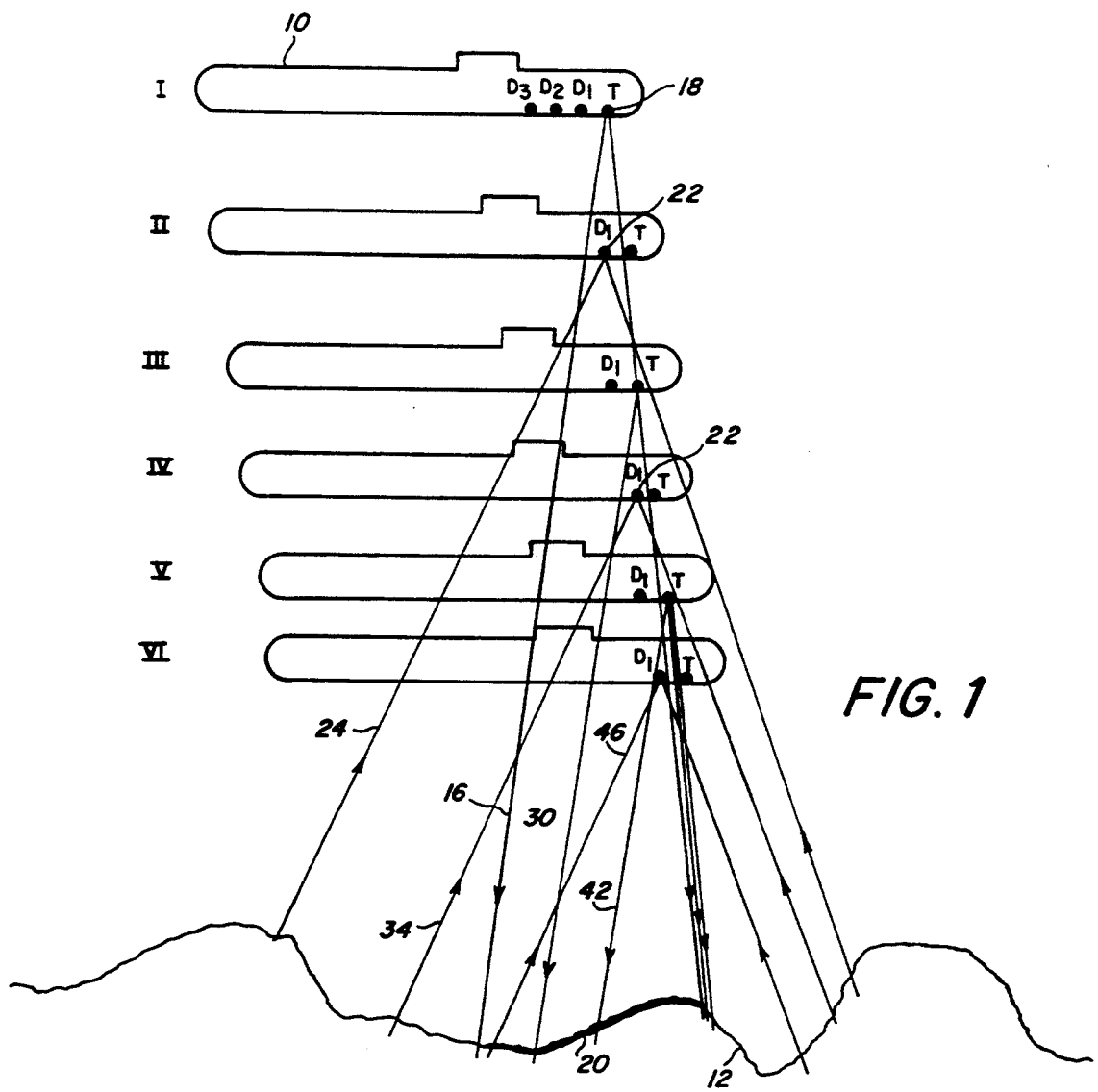
FIG. 1 is a plan view of an underwater vehicle moving in a vertical direction with respect to the ocean floor.

FIG. 1 shows a moving submarine 10. The submarine 10 is shown in six positions designated positions I, II, III, IV, V and VI. The submarine 10 travels from left to right and from top to bottom. The floor of the ocean 12 is roughly parallel with the longitudinal axis of the submarine 10.

Figure 2:
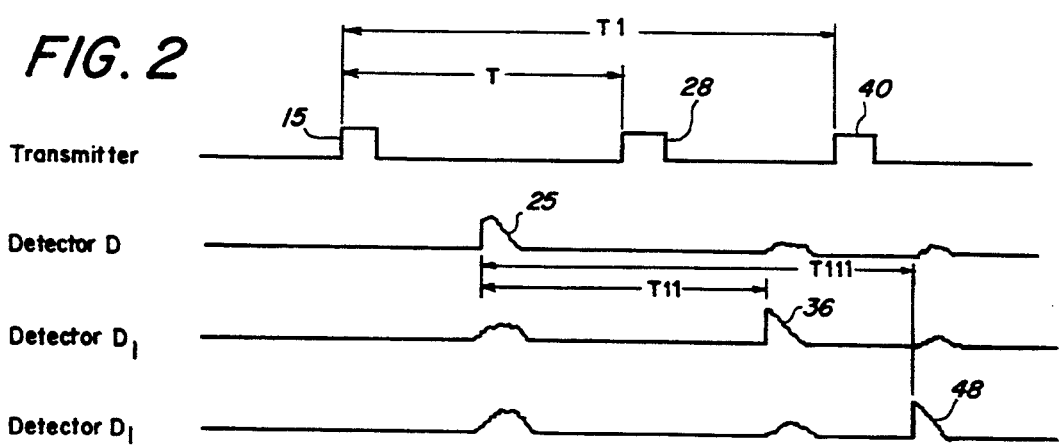
FIG. 2 is a diagrammatic view of three pulses transmitted and received by the moving underwater vehicle of FIG. 1.

When the submarine 10 is in position I, it emits a first transmitted acoustic pulse 15, as shown in FIG. 2. The pulse 15 shown in FIG. 1 produces beam 16 coming from transmitter 18. The beam 16 is reflected from an area 20 of the ocean floor 12. A portion of the first transmitted beam 16 is detected by a reference detector 22 when submarine 10 is in position II. The detector beam 24 covers this received portion. The received portion produces a first detected pulse 25, shown in FIG. 2. The detector 22 is also designated D1 since it is the first detector in a line of detectors D1, D2, D3 and D4. A 4×4 array of such detectors can be used to measure vertical velocity in two dimensional space.

When the submarine 10 is in position III, at a time T after the first emission, it emits a second acoustic pulse 28, shown in FIG. 2. The pulse 28 shown in FIG. 2 produces beam 30, coming from transmitter 18. The second transmitted beam 30 is reflected from area 20 of the ocean floor 12. A portion of the second transmitted beam 30 is detected by a detector 22 when submarine 10 is in position IV. The beam 34 covers this received portion. The received portion produces a second detection pulse 36, shown in FIG. 2. The second output of detector 22 is processed since the output of this detector, among the outputs of D1, D1, D3, and D4, best correlates with the first reference output of 22. The difference in time, T11, between pulses 25 and 36, is measured. In an algorithm one could use the value T, instead of T11, since the two values are almost the same.

When the submarine 10 is in position V, it emits a third acoustic pulse 40, shown in FIG. 2. The pulse 40 shown in FIG. 2 produces a beam 42 coming from transmitter 18. The third transmitted beam 42 is reflected from area 20 of the floor 12. A portion of the third transmitted beam 42 is detected by detector 22 when submarine 10 is in position VI. The detector beam 46 covers this received portion. The received portion produces a third detected pulse 48 shown in FIG. 2.

The third output of detector 22 is processed since the output of this detector, among the output of D1, D2, D3, and D4, best correlates with the first output of detector 22. The difference in time, T111, between pulses 25 and 48, is measured. In an algorithm one could use the value T1, instead of T111 since the two values are almost the same.

This method eliminates ambiguities. The method uses phase shifts and times.

The method for determining vertical velocity, involves the following steps. One determines vertical velocity by measuring the number of sound wave lengths or portions of sound wave lengths that submarine 10 has moved vertically in a measured time.

As an example of the disclosed technique, a sound wave having a six inch wave length is used. Pulses 15 and 28, chosen as shown in FIG. 2, and each having a 6 inch wave length, are sent out. They have the same phase when sent out, such as a zero degrees phase. Pulses 25 and 36 are received. The phase of each pulse 25 and 36 is measured. The frequency of pulses 15 and 28 is chosen as 10,000 cycles per second. The speed of sound, in seawater, is 60,000 inches per second.

The time T11 between pulses 25 and 36, as shown in FIG. 2, is measured. Time T11, for instance, may be one second. If, for example, the first pulse 25 has a phase of 10 degrees from neutral pressure, and the second pulse 36 has a phase of 40 degrees from neutral pressure, one knows that there is a vertical velocity and the vehicle is moving downward, closer to the points of reflection. One also knows that in the time T11 of one second a 30 or 390 or 750 or 1110 or 1470 degree phase shift has occurred in a round trip, due to the downward motion. This is equal to 15 or 195 or 375 or 555 or 735 degrees in one direction, with respect to the sea bed. Since 15 degrees is one-twenty-fourth of a complete cycle, the change in distance is one-twenty-fourth of the 6 inch wave length sound wave. Therefore, the vehicle has fallen 0.25 inches or 3.25 inches, or 6.25 inches or 9.25 inches or 12.25 inches in one second. These correspond to possible vertical velocities of 0.014 miles per hour, 0.184 miles per hour, 0.355 miles per hour, 0.525 miles per hour and 0.696 miles per hour. There is thus an ambiguity in the vertical velocity, as described in U.S. Pat. No. 4,244,026. It is noted that an error in the measurement of time T11 will show up as a phase shift increment.

In order to resolve this ambiguity, pulse 40 is sent out. It has a zero degree phase. It has a frequency of 10,000 cycles per second. It has the same phase as pulses 15 and 28. Pulses 25 and 48 of FIG. 2 are then used. If pulse 48 has a phase of 235 degrees and if T111 is 1.5 seconds, there has been a 225 or 585 or 945, or 1305 or 1665 or 2025 degree phase shift in a round trip in 1.5 seconds, between pulses 25 and 48, due to the downward motion. One also knows that the vehicle has changed 112.5 or 292.5 or 472.5 or 652.5 or 832.5 or 1012.5 degrees in 1.5 seconds with respect to the sea bed. Therefore, the vehicle has fallen 1.875 or 4.875 or 7.875 or 10.875 or 13.875 or 16.875 inches in 1.5 seconds. These distances correspond to vertical velocities of 0.071 miles per hour, 0.184 miles per hour, 0.298 miles per hour or 0.412 or 0.525 or 0.639 miles per hour. The true vertical velocity is 0.184 miles per hour since the two above calculations agree at that vertical velocity value. The 0.184 miles per hour vertical velocity is selected over the next possible vertical velocity value of 0.525 miles per hour, since the amplitude of each of the curves in FIGS. 3 and 4 decreases, as the possible vertical velocities increase and decrease from zero vertical velocity.

Figure 3:
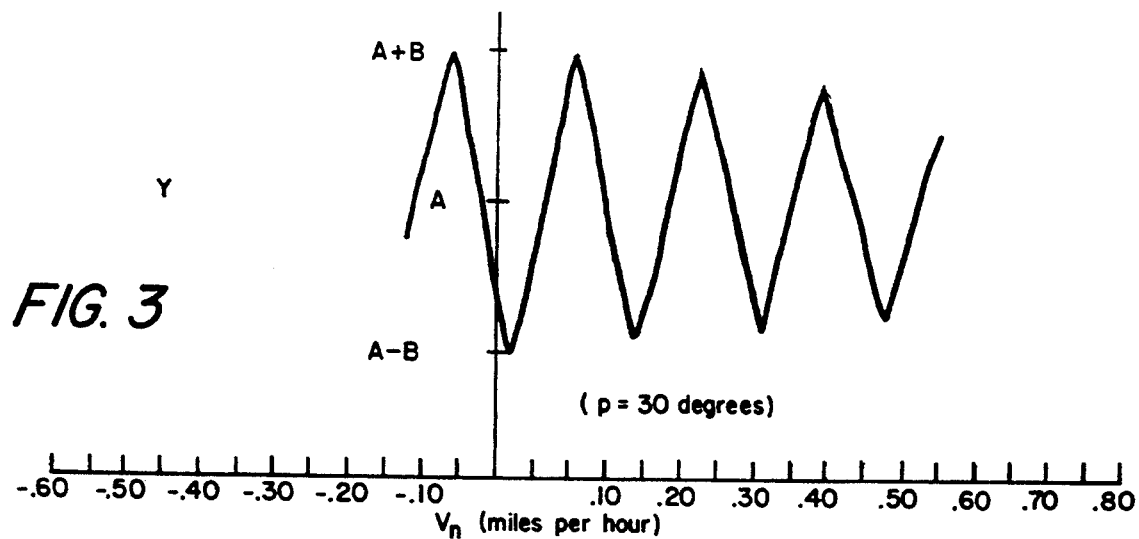
FIG. 3 is a plot of a first algorithm generated using time T11 of FIG. 2.

A function Y expresses correlation versus vertical velocity for pulses 25 and 36. Y is stated below. Y can be used in finding the vertical velocity value, rather than using the method of the example above. This function uses the measured phase shift p and measured time T11, for received pulses 25 and 36. As described above, where the time T11 between pulses 25 and 36 is one second and the measured phase shift p is thirty (30) degrees, the expression Y will be at a minimum possible vertical velocity values at 0.014 miles per hour, 0.184 miles per hour, 0.355 miles per hour, 0.525 miles per hour and 0.696 miles per hour, as shown in FIG. 3. One of these velocities is the true vertical velocity value. One can examine these minima in Y by a graphical technique, after Y is plotted versus vertical velocity Vn.

Figure 4:
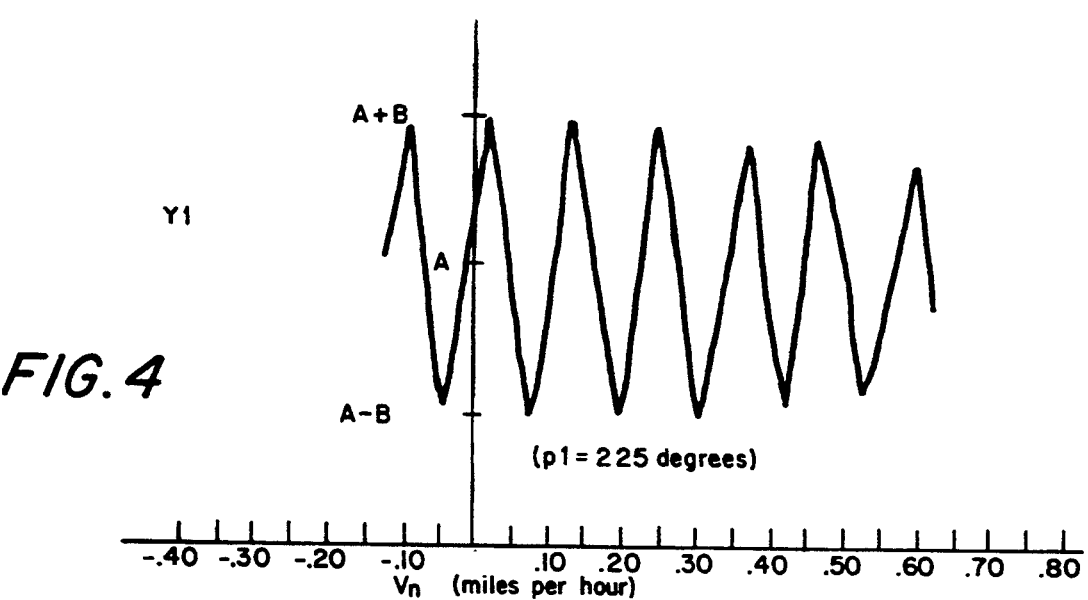
FIG. 4 is a plot of a second algorithm generated using time T111 of FIG. 2.

Similarly the function Y1, given below, expresses correlation between pulses 25 and 48 versus vertical velocity Vn. Y1 can be used in resolving the ambiguity as to vertical velocity found in Y. This function uses the measured phase shift p1 and measured time T111 between pulses 25 and 48. As described above, where the time T111 between pulses 25 and 48 is 1.5 seconds and the measured phase shift p1 is 225 degrees, the expression Y1 is at minimum at possible vertical velocity values of 0.071 miles per hour, 0.184 miles per hour, 0.298 miles per hour, 0.412 miles per hour and 0.523 miles per hour, as shown in FIG. 4. One can determine these minima in vertical velocity values Y1 by a graphical technique, after Y1 is plotted.

The correlation time T11, for a correlation between pulses 25 and 36 can be used in generating ambiguity function Y, wherein $$Y = A - B \cos((4 Pi f o/co) Vn T11 - p).$$

The correlation time T111, for a correlation between pulses 25 and 48, can be used in generating ambiguity function Y1, wherein $$Y1 = A - B \cos((4 Pi f o/co) Vn T111 - p1).$$

Vn is the vertical velocity of submarine 10. A and B are slow-varying functions of vertical velocity Vn. A is essentially a constant. B causes the curves in FIGS. 3 and 4 to taper in amplitude as they go away from the verticle axis. B is Bo times the natural log of e raised to the minus Vn squared power. Bo is the amplitude at Vn=0. Bo is a scaling factor for the curves in FIGS. 3 and 4. Vn is in miles per hour. co is the phase velocity of sound in seawater at the hydrophone array. fo is the operating frequency of the transmitted pulses. p is the measured phase shift between two correlated received pulses 25 and 36. p1 is the measured phase shift between two correlated received pulses 25 and 48. T11 is the correlation time, between pulses 25 and 36. T111 is the correlation time between pulses 25 and 48. Pi is equal to 3.1416.

Figure 5:
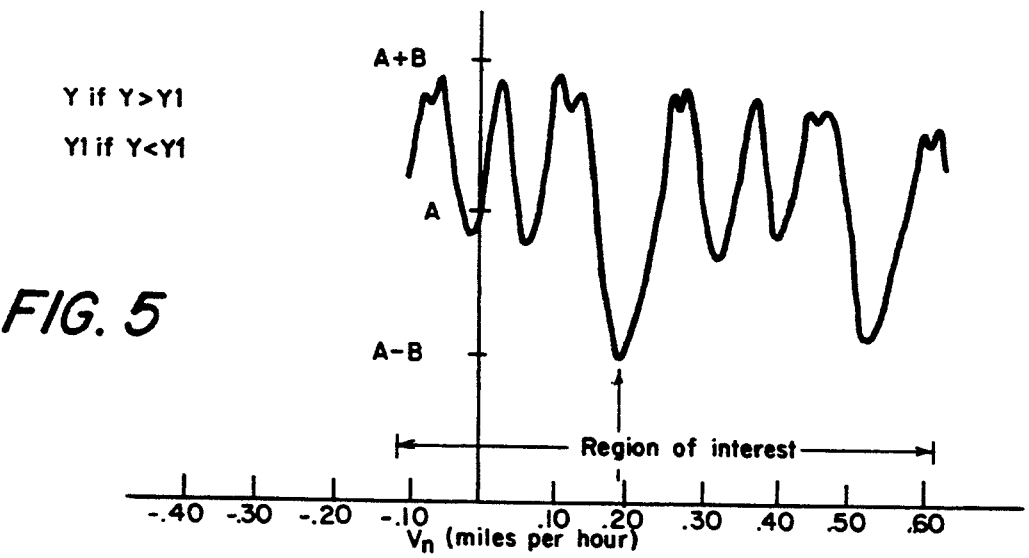
FIG. 5 is a plot of the greater value of the two algorithms of FIGS. 3 and 4.

FIGS. 3 and 4 are plots of Y and Y1 versus Vn. The separation between minimum lobes in FIG. 3 is (co/2foT11). The separation between minimum lobes in FIG. 4 is (co/2foT111). The greater value of either of the values Y and Y1, at each value of Vn, within a range of interest, is plotted in FIG. 5. FIG. 5 has a lowest minimum at 0.184 miles per hour, within the range of interest. The range of interest encompasses likely positive vertical values. This minimum is the true vertical velocity Vn of underwater vehicle 10. This value correspondes to the vertical value using the non-graphical technique desired above.

The above described method can be used to determine vertical velocity, without having the ambiguity that is described in the first full paragraph in column 10 of of U.S. Pat. No. 4,244,026. Apparatus and techniques with which the disclosed method is practiced, are described in the '026 patent. The description and teachings of U.S. Pat. No. 4,244,026 is incorporated herein by reference.

While the present invention has been disclosed in connection with the preferred embodiment thereof, it should be understood that there may be other embodiments which fall within the spirit and scope of the invention as defined by the following claims.

What is claimed is:

1. A method of resolving an ambiguity in the vertical velocity of a moving vehicle having a transmitter and several detectors, comprising:
   (a) transmitting a first acoustic pulse having a known phase from the transmitter toward a bottom surface of a body of water;
   (b) detecting a reception time and phase for a first reflected pulse by means of a first detector;
   (c) determining a phase shift between the first transmitted pulse and first reflected pulse;
   (d) transmitting a second acoustic pulse having a known phase from the transmitter toward the bottom surface of a body of water;
   (e) detecting a reception time and phase for a second reflected pulse by means of all detectors;
   (f) correlating the first output of the first detector with the second output of the several detectors to identify a first correlating detector;
   (g) determining a phase shift between the second transmitted pulse and second reflected pulse at the first correlating detector;
   (h) determining a first reception time difference and first phase shift difference for the first reflected pulse and second reflected pulse;
   (i) generating a first output of possible vertical velocities based on a first algorithm that is dependent on the first reception time difference and first phase shift difference;
   (j) transmitting a third acoustic pulse having a known phase from the transmitter toward the bottom surface of a body of water;
   (k) detecting a reception time and phase for a third reflected pulse by means of all detectors;
   (l) correlating the first output of the first detector with the third output of the several detectors to identify a second correlating detector;
   (m) determining phase shift between the third transmitted pulse and third reflected pulse at the second correlating detector;
   (n) determining a second reception time difference and second phase shift difference for the first reflected pulse and third reflected pulse;
   (o) generating a second output of possible vertical velocities based on a second algorithm that is dependent on the second reception time difference and second phase shift difference; and
   (p) comparing the first output and the second output to determine the true vertical velocity.

2. A method of resolving an ambiguity in the vertical velocity of a moving vehicle comprising:
   (a) transmitting a first acoustic pulse having a known phase toward a bottom surface of a body of water;
   (b) detecting a reception time and phase for a first reflected pulse;
   (c) determining a phase shift between the first transmitted pulse and first reflected pulse;
   (d) transmitting a second acoustic pulse having a known phase toward the bottom surface of a body of water;
   (e) detecting a reception time and phase for a second reflected pulse;
   (f) determining a phase shift between the second transmitted pulse and second reflected pulse;
   (g) determining a reception time difference and phase shift difference for the first and second reflected pulses; and
   (h) generating an output of possible vertical velocities based on an algorithm that is dependent on the reception time difference and the phase shift difference, wherein the algorithm has the form $Y = A - B \cos((4 Pi fo/co) Vn T11 - p)$ and wherein Y is a function that expresses correlation between the two reflected pulses versus vertical velocity, Vn is the vertical velocity of the moving vehicle, A is essentially a constant, B is Bo times a natural log e raised to a minus Vn squared power, Bo is a scaling factor, Pi is 3.1416, co is a phase velocity of sound in water, fo is an operating frequency of the transmitted pulses, p is a measured phase shift difference between two correlated reflected pulses, and T11 is a reception time difference between the two reflected pulses.

3. A method of resolving an ambiguity in the vertical velocity of a moving vehicle comprising:
   (a) transmitting a first acoustic pulse having a known phase toward a bottom surface of a body of water;
   (b) detecting a reception time and phase for a first reflected pulse;
   (c) determining a phase shift between the first transmitted pulse and first reflected pulse;
   (d) transmitting a second acoustic pulse having a known phase toward a bottom surface of a body of water;
   (e) detecting a reception time and phase for a second reflected pulse;
   (f) determining a phase shift between the second transmitted pulse and second reflected pulse;
   (g) determining a first reception time difference and first phase shift difference for the first and second reflected pulses;
   (h) generating a first output of possible vertical velocities that is dependent on the first reception time difference and the first phase shift difference;
   (i) transmitting a third acoustic pulse having the same known phase toward the bottom surface of a body of water;
   (j) detecting a reception time and phase for a third reflected pulse;
   (k) determining a phase shift between the third transmitted pulse and third reflected pulse;
   (l) determining a second reception time difference and second phase shift difference for the first and third reflected pulses;
   (m) generating a second output of possible vertical velocities that is dependent on the second reception time difference and second phase shift difference; and (n) comparing the first output and the second output to determine the true vertical velocity.

4. A method of resolving an ambiguity in the vertical velocity of a moving vehicle comprising:
   (a) transmitting a first acoustic pulse having a known phase toward a bottom surface of a body of water;
   (b) detecting a reception time and phase for a first reflected pulse;

(c) determining a phase shift between the first transmitted pulse and first reflected pulse;

(d) transmitting a second acoustic pulse having a known phase toward a bottom surface of a body of water;

(e) detecting a reception time and phase for a second reflected pulse;

(f) determining a phase shift between the second transmitted pulse and second reflected pulse;

(g) determining a first reception time difference and first phase shift difference for the first and second reflected pulses;

(h) generating a first output of possible vertical velocities that is dependent on the first reception time difference and the first phase shift difference wherein the first generation of output is based on a first algorithm that has the form $Y = A - B \cos((4 \mathrm{Pi} fo/co) Vn T11 - p)$;

(i) transmitting a third acoustic pulse having the same known phase as the second transmitted acoustic pulse, toward the bottom surface of a body of water;

(j) detecting a reception time and phase for a third reflected pulse;

(k) determining a phase shift between the third transmitted pulse and third reflected pulse;

(l) determining a second reception time difference and second phase shift difference for the first and third reflected pulses;

(m) generating a second output of possible vertical velocities that is dependent on the second reception time difference and second phase shift difference wherein the second generation of output is based on a second algorithm that has the form $Y1 = A - B \cos((4 \mathrm{Pi} fo/co) Vn T111 - p1)$; and (n) comparing the first output and the second output to determine the true vertical velocity, wherein Y is a function that expresses correlation between the first and second reflected pulses versus vertical velocity, Y1 is a function that expresses correlation between the first and third reflected pulse versus vertical velocity, Vn is the vertical velocity of the moving vehicle, A is essentially a constant, B is Bo times a natural log e raised to the minus Vn squared power, Bo is a scaling factor, Pi is 3.1416, co is the phase velocity of sound in water at the hydrophone array, fo is the operating frequency of the transmitted pulses, p is the measured phase shift difference between the first and second correlated reflected pulses, p1 is the measured phase shift difference between the first and third reflected pulses, T11 is the reception time difference between the first and second reflected pulses, and T111 is the reception time difference between the first and third reflected pulses.

* * * * *